Dec. 23, 1952 T. K. STEHLE 2,622,266
HINGE
Filed Feb. 26, 1948 2 SHEETS—SHEET 1

INVENTOR.
Thomas K. Stehle
BY
Morsell & Morsell
ATTORNEYS.

Dec. 23, 1952     T. K. STEHLE     2,622,266
HINGE
Filed Feb. 26, 1948     2 SHEETS—SHEET 2
Fig. 3.
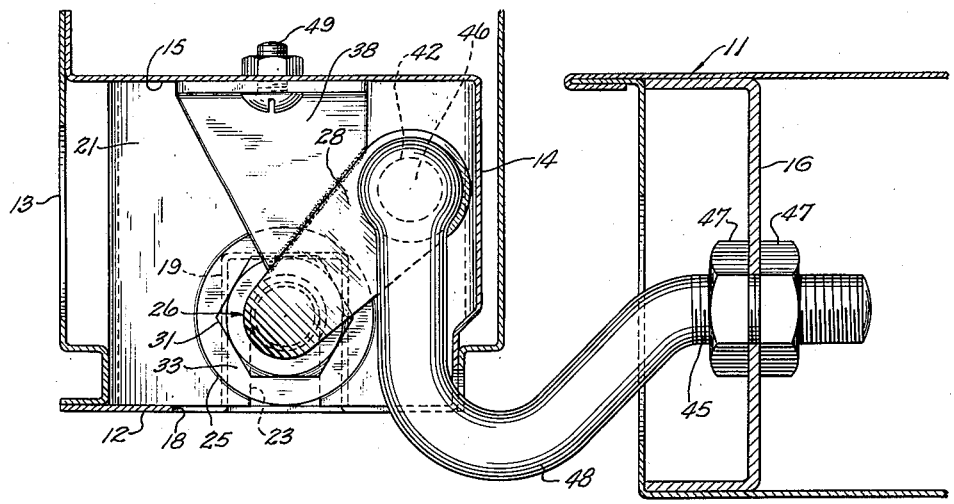
Fig. 4.
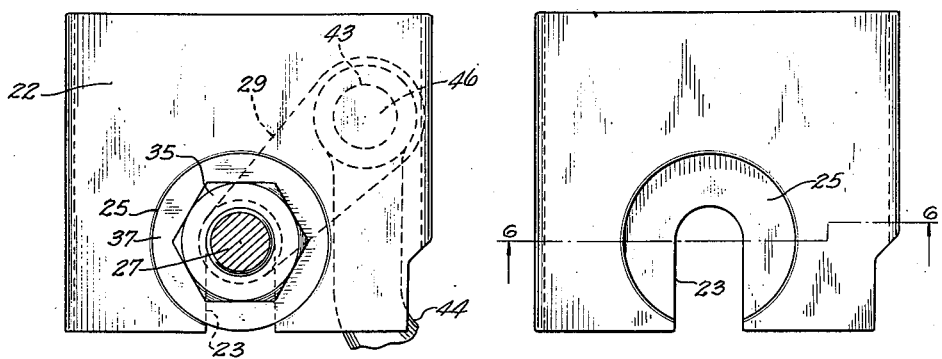
Fig. 5.
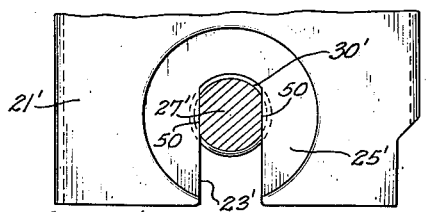
Fig. 6.
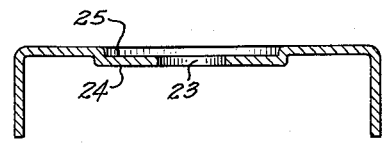
Fig. 7.
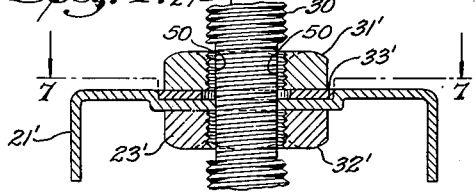
Fig. 8.
INVENTOR.
Thomas K. Stehle
BY
Morsell & Morsell
ATTORNEYS.

Patented Dec. 23, 1952

2,622,266

UNITED STATES PATENT OFFICE 2,622,266

HINGE

Thomas K. Stehle, Milwaukee, Wis.

Application February 26, 1948, Serial No. 11,211

8 Claims. (Cl. 16—132)

This invention relates to improvements in hinges, and more particularly to door hinges for automobiles or like vehicles.

The car door hinges which have heretofore been developed have not proven entirely satisfactory. This is because these prior constructions have been relatively difficult and expensive to manufacture, have made the installation and removal of the door difficult and time consuming, or have made no adequate provision for adjustments in the position of the door during the hanging thereof. Such adjustments are desirable when it is necessary to compensate for inaccuracies in the manufacture of the car body.

It is therefore a general object of the present invention to provide a hinge construction which facilitates the installation on a vehicle either during original manufacture or during a replacement or repair operation.

A further object of the invention is to provide a car door hinge construction which provides for adjustment of the vertical position of the car door relative to the car body.

A further object of the invention is to provide a car door hinge which is simple and easy to manufacture and therefore inexpensive, and which does not require any appreciable change in the car body construction.

A further object of the invention is to provide a car door hinge of the class described which is of the concealed type, there being no parts which project exteriorly of the car body to interfere with modern streamline vehicle design.

A further object of the invention is to provide a car door hinge of the class described wherein the major portion may be preassembled on the car door at any desired stage of manufacture.

A further object of the invention is to provide a car door hinge of the class described which is made of a minimum number of component parts, which is strong and durable, and which is otherwise well adapted for the purposes described.

With the above and other objects in view, the invention consists of the improved door hinge and all of its parts and combinations, as set forth in the claims, and all equivalents thereof.

In the drawing accompanying and forming a part of this specification, wherein are illustrated preferred embodiments of the invention, and wherein the same reference characters designate the same parts in all of the views:

Fig. 3 is a transverse sectional view taken approximately along the line 3—3 of Fig. 1;

Fig. 4 is a transverse sectional view taken approximately along the line 4—4 of Fig. 1;

Fig. 5 is a plan view of one of the slotted channel members which form a part of the preferred form of the invention;

Fig. 6 is a vertical sectional view taken along the line 6—6 of Fig. 5;

Fig. 7 is a fragmentary horizontal sectional view of a modified form of the invention taken along the line 7—7 of Fig. 8; and Fig. 8 is a fragmentary vertical sectional view of a modified form of channel member and main body portion which may be used in the improved hinge construction.

Figure 1:
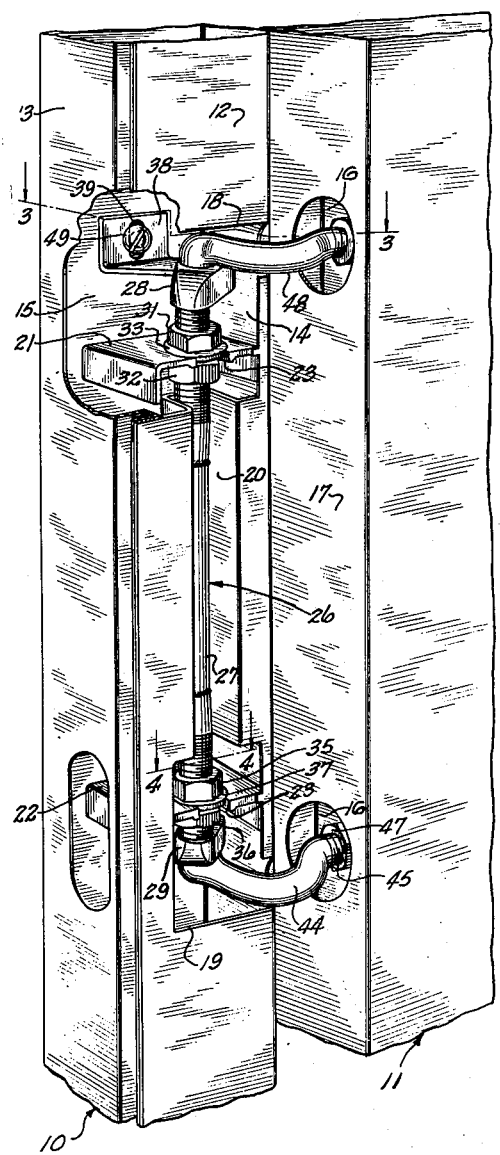
Fig. 1 is a fragmentary perspective view of a car body and door with the improved door hinge associated therewith, part of the car body being broken away to more clearly show the improved construction.

Referring more particularly to Fig. 1 of the drawing, the numeral 10 indicates a portion of the part of the body of a car commonly called the door frame and to which a door hinge is conventionally attached. The numeral 11 indicates a portion of a car door which fits into the door frame when the door is in closed position. The door frame portion 10 is formed with a substantially rectangular, vertically extending cavity bounded by an end wall 12, by a pair of side walls 13 and 14, and by an inner wall 15. The door 11 is formed with a vertically extending channel member 16 positioned adjacent the inner side of an end wall 17 thereof. The end wall 12 of the door frame 10 is formed with a pair of spaced, generally rectangular apertures 18 and 19 which are connected by a vertically extending depressed channel portion 20.

Fixedly positioned, as by welding or other suitable means, within the walls 12, 13, 14 and 15 of the frame 10, and adjacent the upper aperture 18 thereof, is an upper channel member 21 having a horizontally extending web or plate portion. Similarly positioned adjacent the lower aperture 19 is an identical channel member 22. Referring to Figs. 5 and 6, the webs or plates of the members 21 and 22 are each formed with a slot 23 extending inwardly from the edge thereof which is positioned adjacent the wall 12. Positioned adjacent the same edge is shoulder means for preventing lateral displacement of the hinge assembly from the slots 23. This preferably takes the form of a circular, downwardly offset portion 24, which forms a circular recess 25 in the upper surface of the plate, as is clearly shown in Figs. 5 and 6. The construction hereinbefore mentioned may be incorporated in a conventional car door frame during the manufacture thereof without difficulty or appreciable expense.

Figure 2:
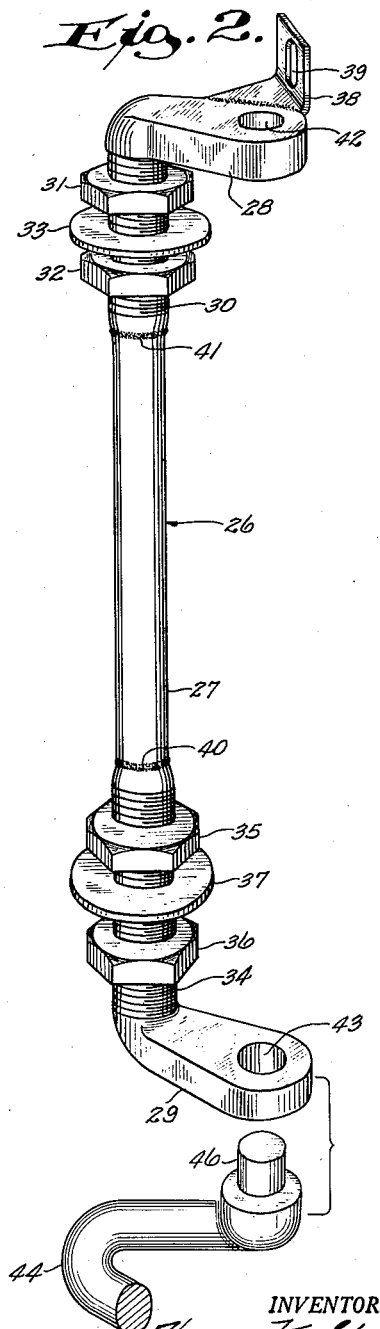
Fig. 2 is an enlarged perspective view of the main body portion of the improved door hinge, together with a fragmentary showing of a lower pivot arm.

Referring to Fig. 2, the numeral 26 indicates the main body portion of the improved hinge. In the preferred form of the invention, the main body portion 26 is comprised of an elongated bolt 27 formed at its upper end with a laterally extending arm 28 and at its lower end with a similar and substantially parallel laterally extending arm 29. The arm 28 is formed with a vertically extending aperture 42, and the arm 29 is formed with a like aperture 43. Adjacent the arm 28, the rod 26 is preferably formed with an extent of threading 30 on which there is a pair of nuts 31 and 32 having a flat circular washer 33 therebetween. Adjacent the arm 29, the rod 26 is preferably formed with an extent of threading 34 on which there is a pair of nuts 35 and 36 having a flat circular washer 37 interposed therebetween. Connected to the arm 28, as by welding, is an angularly cut angle bracket 38 having a vertically extending slot 39 formed therein.

While the unitary bolt 27, including the arms 28 and 29 and the threaded portions 20 and 34, is the preferred form of this part of the improved hinge construction, the invention will also work satisfactorily if the bolt 27 is made in two disconnected parts, i. e., a part consisting of the threaded portion 30, plus the arm 28 and bracket 38, and a part consisting of the threaded portion 34 and the arm 29. As a matter of fact, experience has shown that the best way to manufacture the unitary bolt 27, is to form it originally of three parts and then connect the above-mentioned two parts with an extent of rod or tubing by the use of welding, as indicated at 40 and 41, after the nuts 31, 32, 35 and 36, as well as the washers 33 and 37 have been put in place on the respective threaded portions 30 and 34.

A curved pivot arm 44, having one end threaded as at 45, and having its other end formed with a pintle 46 which fits into the aperture 43 of the arm 29, is connected to the channel 16 of the car door 11, as by nuts 47 on the threading 45. The pivot arm 44 is associated with the arm 29 in such a manner that the pintle 46 extends upwardly through the aperture 43 from the pivot arm 44 located immediately therebelow, as is indicated by the exploded showing of Fig. 2, and corroborated by the showing of Figs. 1 and 4. Similarly connected to the channel 16 and spaced above the pivot arm 44, is an oppositely bent but otherwise identical pivot arm 48. The pivot arm 48 is so disposed that the pintle 46 thereof extends downwardly through the aperture 42 of the arm 28 as shown in Figs. 1 and 3.

The main body portion 26 of the improved hinge, and the pivot arms 44 and 48 can be preassembled on a car door at any desired stage in the manufacturing operation. To install a door with the abovementioned parts preassembled thereon, it is only necessary that the nuts 31 and 32, as well as the nuts 35 and 36, be spaced apart a short distance in the manner shown in Fig. 2. The door is then placed in such position that the threaded portions 30 and 34 of the bolt 27 enter the slots 23 of the members 21 and 22 respectively, with the washers 33 and 37 respectively positioned thereabove, and with the nuts 32 and 36 positioned respectively therebelow.

The washers 33 and 37 are then permitted to drop into the recesses 25 in the resepctive members 21 and 22 and to seat themselves therein. By turning the nuts 31 and 35, the proper position of vertical adjustment of the door 11 in the frame 10 can be attained. When this position has been thus reached, the bolt 27 may be locked against axial rotation by means of a bolt 49 which secures the bracket 38 to the wall 15 through the slot 39, as shown in Figs. 1 and 3. The final step in the installation of the door 11 with the improved hinge, is to turn the nuts 32 and 36 up into tight engagement with the underside of the respective members 21 and 22. The nuts 32 and 36 thus act as jam or lock nuts to hold the washers 33 and 37 firmly seated in the respective recesses 25 of the members 21 and 22. While the washers 33 and 37 are held firmly seated in this manner, the rod 27 is likewise rigidly held in its proper position. It cannot move in any direction. The pivot arms 48 and 44, however, are free to pivot about the pintles 46 in the apertures 42 and 43, thereby permitting the opening and closing of the door 11.

It will be noted that should the door 11 require an adjustment in its horizontal position relative to the frame 10, this adjustment may be quickly accomplished by an adjustment of the nuts 47 on the pivot arms 44 and 48 (see Fig. 3), either inwardly or outwardly, as the case requires. By oppositely adjusting the nuts of the arm 44 relative to those of arm 48, an angular adjustment in the position of the door 11 relative to the frame 10 is possible.

A construction alternative to the use of the bracket 38, for preventing axial rotation of the rod 27, is shown in Figs. 7 and 8. In this construction, a channel member 21' similar to the member 21, is formed with a slot 23' which has a width less than the diameter of the threaded portion 30' of the rod 27'. The rod 27' is formed with a pair of parallel flat surfaces 50, between which the rod 27' has a thickness substantially equal to the width of the slot 23'. It is apparent, therefore, that when the rod 27' is placed in the slot 23' with the surfaces 50 in immediate contact with the sides of the slots 23', the rod 27' is prevented from turning axially. The nuts 31' and 32', as well as the washer 33', serve the same purpose in the modified form as the nuts 31 and 32, and the washer 33 do in Figs. 1 and 3.

By the use of the improved hinge with portions thereof preassembled on a car door, the hanging of said door with adjustments thereof to make a perfect fit, requires only a matter of seconds. This is in contrast with the slow method now used wherein there are many bolts or screws to be installed and wherein no provision is made for adjustment to compensate for imperfections in the car body.

The improved construction provides a car door hinge of the concealed type which is both novel in construction and easy to manufacture. The improved hinge is not limited to use on car doors, but may be used in connection with other hinged members. Refrigerators, trucks, airplanes, buildings and the like can employ the improved construction to great advantage.

Various changes and modifications may be made without departing from the spirit of the invention, and all of such changes are contemplated, as will come within the scope of the claims.

What I claim is:

1. A door hinge comprising a pair of vertically spaced plates adapted to be mounted substantially horizontally in a door frame, said plates each having a slot communicating with an edge thereof, a vertically extending bolt, means for supporting said bolt in the slots of said plates, said bolt being formed with an arm projecting laterally from each end thereof, a first pivot arm adapted to be connected at one end to a door and pivotally connected at the other end to one of said bolt arms, and a second pivot arm adapted to be connnected to said door and pivotally connected at the other end to the other of said bolt arms.

2. A door hinge comprising a pair of vertically spaced plates adapted to be mounted substantially horizontally in a door frame, said plates each having a slot communicating with an edge thereof, a vertically extending bolt positioned in the slots of said plates, said bolt being formed with an arm projecting laterally from each end thereof, a first pivot arm adapted to be connected at one end to a door and pivotally connected at the other end to one of said bolt arms, a second pivot arm adapted to be connected to said door and pivotally connected at the other end to the other of said bolt arms, and two sets of nuts threaded on said bolt to clamp said bolt to said plates whereby the vertical position of said pivot arms may be simultaneously adjusted.

3. A door hinge comprising a plate adapted to be mounted substantially horizontally in a door frame, said plate having a slot communicating with an edge thereof and having a circular recess adjacent said slot, a substantially vertically extending bolt positioned in said slot and formed with a laterally projecting arm, a first nut threaded on said bolt above said plate, a second nut threaded on said bolt below said plate, a circular washer on said bolt positioned in said recess between said nuts, said nuts acting to lock said bolt in a selected position of vertical adjustment, and said washer in said recess acting to prevent movement of said bolt longitudinally of said slot, and a pivot arm pivotally connected at one end to said bolt arm and adapted to be connected to a door at the other end.

4. A door hinge comprising a plate adapted to be mounted substantially horizontally in a door frame, said plate having a slot communicating with an edge thereof and having a circular recess adjacent said slot, a substantially vertically extending bolt positioned in said slot and formed with a laterally projecting arm, a first nut threaded on said bolt above said plate, a second nut threaded on said bolt below said plate, a circular washer on said bolt positioned in said recess between said nuts, said nuts acting to lock said bolt in a selected position of vertical adjustment, and said washer in said recess acting to prevent movement of said bolt longitudinally of said slot, a bracket connected to said bolt and adapted to be connected to said door frame for preventing axial rotation of said bolt, and a pivot arm pivotally connected at one end to said bolt arm and adapted to be connected to a door at its other end.

5. A door hinge comprising a pair of vertically spaced plates adapted to be mounted substantially horizontally in a door frame, said plates each having a slot communicating with an edge thereof, a vertically extending bolt positioned in the slots of said plates, means for supporting said bolt in said slots, said bolt being formed with an arm projecting laterally from each end thereof, a first pivot arm adapted to be connected at one end to a door and pivotally connected at the other end to one of said bolt arms, a second pivot arm adapted to be connected to said door and pivotally connected at the other end to the other of said bolt arms, and means in addition to said bolt supporting means for preventing rotation of said bolt.

6. A door hinge comprising a pair of vertically spaced plates adapted to be mounted substantially horizontally in a door frame, said plates each having a slot communicating with an edge thereof, a vertically extending bolt in said slots formed with a flat surface portion in immediate contact with a side of one of said slots for preventing axial rotation of said bolt, means for supporting said bolt in the slots of said plates, said bolt being formed with an arm projecting laterally from each end thereof, a first pivot arm adapted to be connected at one end to a door and pivotally connected at the other end to one of said bolt arms, and a second pivot arm adapted to be connected to said door and pivotally connected at the other end to the other of said bolt arms.

7. A door hinge comprising a pair of vertically spaced plates adapted to be mounted substantially horizontally in a door frame, said plates each having a slot communicating with an edge thereof, a vertically extending bolt, means for supporting said bolt in the slots of said plates, said bolt being formed with an arm projecting laterally from an end thereof, a pivot arm adapted to be connected at one end to a door and pivotally connected at the other end to said bolt arm, and a bracket connected to said bolt and adapted to be connected to said door frame for preventing axial rotation of said bolt.

8. A door hinge comprising a pair of vertically spaced plates adapted to be mounted substantially horizontally in a door frame, said plates each having a slot communicating with an edge thereof, a vertically extending bolt positioned in the slots of said plates, said bolt being formed with an arm projecting laterally from each end thereof, a first pivot arm adapted to be connected at one end to a door and pivotally connected at the other end to one of said bolt arms, a second pivot arm adapted to be connected to said door and pivotally connected at the other end to the other of said bolt arms, two sets of clamping means each including nuts threaded on said bolt to clamp said bolt to said plates whereby the vertical position of said pivot arms may be simultaneously adjusted, and shoulder means on at least one of said plates cooperable with a portion of the adjacent clamping device to prevent lateral movement of said bolt out of said slots.

THOMAS K. STEHLE.

REFERENCES CITED

The following references are of record in the file of this patent:

UNITED STATES PATENTS

| Number | Name | Date |
| --- | --- | --- |
| 440,320 | Macy | Nov. 11, 1890 |
| 527,685 | Haege | Oct. 16, 1894 |
| 1,185,233 | Minnis | May 30, 1916 |
| 1,539,708 | Whiteford | May 26, 1925 |

FOREIGN PATENTS

| Number | Country | Date |
| --- | --- | --- |
| 22,767/29 | Australia | Sept. 30, 1929 |
| 504,202 | Germany | Aug. 1, 1930 |